United States Patent
Bone

[11] 3,781,965
[45] Jan. 1, 1974

[54] REPAIR OF LIFTING LUGS ON INGOT MOULDS

[75] Inventor: Donald Bone, Cheadle Hulme, England

[73] Assignee: Hilti Aktiengesellschaft, Landstrasse, Schaan, Liechtenstein

[22] Filed: Oct. 2, 1972

[21] Appl. No.: 294,202

[30] Foreign Application Priority Data
Oct. 29, 1971  Great Britain.................. 50,305/71

[52] U.S. Cl................. 29/401, 29/402, 29/DIG. 48, 249/205
[51] Int. Cl............................ B22c 9/12, B23p 7/00
[58] Field of Search..................... 29/401, 402, 530, 29/DIG. 48; 76/107 R; 249/205

[56] References Cited
UNITED STATES PATENTS

| 113,004 | 3/1871 | Barnett............................ 29/401 X |
| 2,415,905 | 2/1947 | Overton........................... 29/402 X |
| 2,504,509 | 4/1950 | Erickson............................... 29/401 |
| 2,874,005 | 2/1959 | Engstrom........................ 29/401 X |
| 3,360,845 | 1/1968 | Buschmann........................... 29/401 |
| 3,629,928 | 12/1971 | Hammerle ........................... 29/402 |

FOREIGN PATENTS OR APPLICATIONS

| 90,547 | 3/1961 | Denmark............................. 29/402 |
| 45/8849 | 3/1970 | Japan.................................. 29/402 |

Primary Examiner—Charles W. Lanham
Assistant Examiner—D. C. Reiley, III
Attorney—Kenwood Ross et al.

[57] ABSTRACT

To restore an ingot mould to usefulness after a lifting lug thereof has been damaged by its lobe having been broken off, a repair plate is secured to the upper outer surface of the remaining part of the lifting lug by means of anchorages of weld metal which fill bulb holes in the remaining part of the lug and corresponding holes in the repair plate which is disposed to project downwards adjacent and to define a cavity between itself and the fractured surface of the lug, which cavity is then filled with weld metal.

4 Claims, 7 Drawing Figures

REPAIR OF LIFTING LUGS ON INGOT MOULDS

FIELD OF THE INVENTION

This invention concerns the repair of lifting lugs on ingot moulds.

SUMMARY OF THE INVENTION

The invention provides a method of repairing a damaged lifting lug of an ingot mould which comprises forming bulb holes in the remaining part of the damaged lifting lug from the upper outer surface thereof, securing a repair plate to said outer surface of said remaining part of the damaged lifting lug, by weld metal in said bulb holes and registering holes in said repair plates, so that said repair plate projects downwards and defines a cavity between itself and the fractured surface of said damaged lug, and filling said cavity with weld metal.

As used herein, the term "bulb hole" is intended to mean a hole whose shape is such that its cross-section enlarges with increase in distance from the said outer surface, so that the weld metal occupying said bulb hole cannot escape from said hole unless the weld metal or the material of the ingot mould surrounding said bulb hole is destroyed.

The invention also includes, of course, an ingot mould repaired by the method aforesaid.

DESCRIPTION OF THE DRAWINGS

In order that the invention may be fully understood, it will be described further, by way of example, with reference to the accompanying diagrammatic drawings, in which.

DETAILED DESCRIPTION OF THE INVENTION

Figures 1, 2:
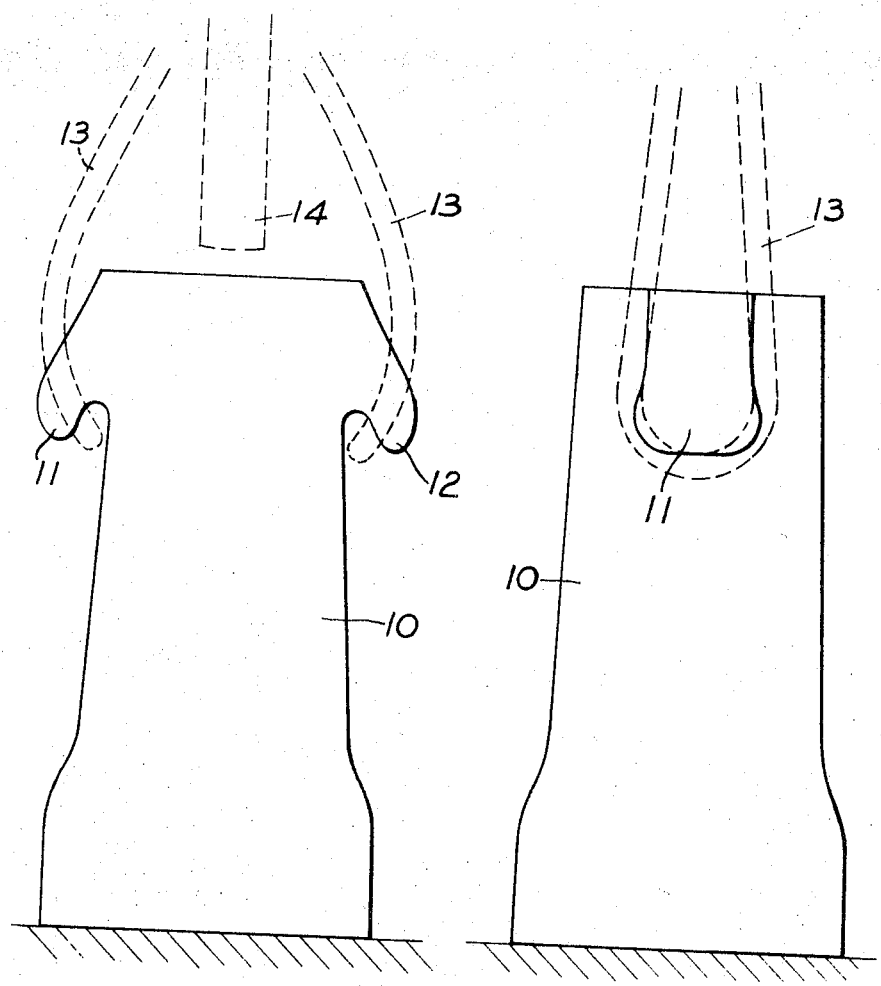
FIG. 1 is a diagrammatic front view illustrating an undamaged ingot mould, as well as a lifting tong arrangement which is used for raising and lowering the mould.
FIG. 2 is a diagrammatic side view corresponding to FIG. 1.

Referring firstly to FIGS. 1 and 2, conventional ingot moulds, such as the illustrated ingot mould 10, are usually formed with lifting lugs 11, 12, having downwardly and outwardly projecting lobes, at two opposite sides, and an overhead crane arrangement (not shown) is fitted with apertured tongs 13 engageable with the lugs 11, 12 for raising and lowering the mould 10. In the casting of an ingot in the mould 10, molten metal is poured into the mould 10 which is open-bottomed. When the poured metal has solidified and cooled, the mould 10 is lifted by means of the tongs 13 and usually this will leave the cast ingot behind, the mould 10 simply being drawn off upwards from the ingot.

It will be understood that it is not unusual for the cast ingot to remain fast in the mould 10, so that upon raising of the latter the ingot is raised also and is not freed from the mould 10. To deal with this problem, the overhead crane arrangement is additionally provided with an ejector ram which is indicated diagrammatically at 14, and this can add a force of, for example, up to 40 tons to the weight of the ingot (which may be about 10 tons) to ensure that it becomes released from the mould 10.

Having regard to the very extreme usage to which they are put, it is not surprising that ingot moulds are susceptible to failure and breakage. The heat shocks to which they are subjected, upon the pouring-in of the molten metal, encourage the formation of cracks and fissures, and it is not unusual for breakage of one of the lifting lugs 11 or 12 to occur, particularly when the ejector ram 14 is used. Such a breakage of a lifting lug 16 of a mould 10 similar to that of FIGS. 1 and 2 has been indicated at 15 in FIG. 3. It will be seen that the whole of the bottom lobe of the lifting lug 16 has been broken away, and insufficient material remains for reliable engagement by the tongs 13. Such a breakage is extremely serious, because it normally means that the mould 10, which may cost as much as 600 pounds, can no longer be used.

Figure 3:
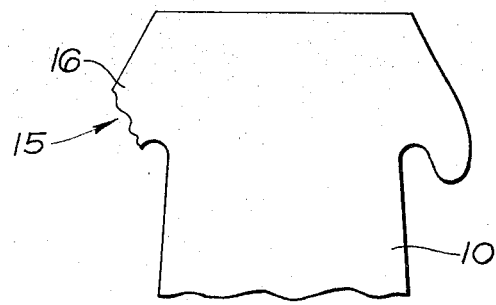
FIG. 3 is a fragmentary front view showing the mould of FIG. 1 with one of its lifting lugs damaged.

Lug breakages of the type indicated in FIG. 3 are quite common and can, in practice, occur the very first time the mould 10 is used, in which case substantially the entire cost of the mould is wasted.

Figure 4:
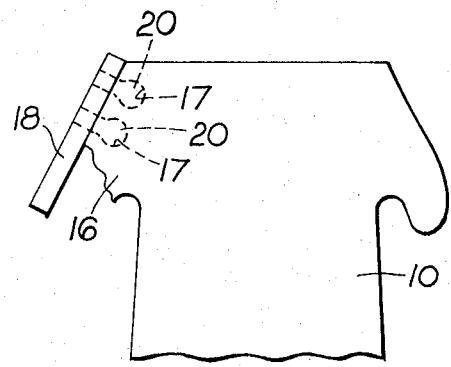
FIG. 4 is a view similar to FIG. 3 but showing the mould after completion of a first step in the repair of the damaged lifting lug.
Figure 5:
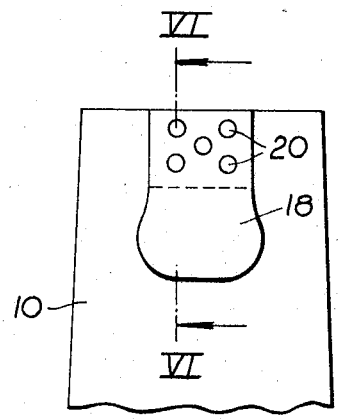
FIG. 5 is a side view corresponding to FIG. 4.
Figures 6, 7:
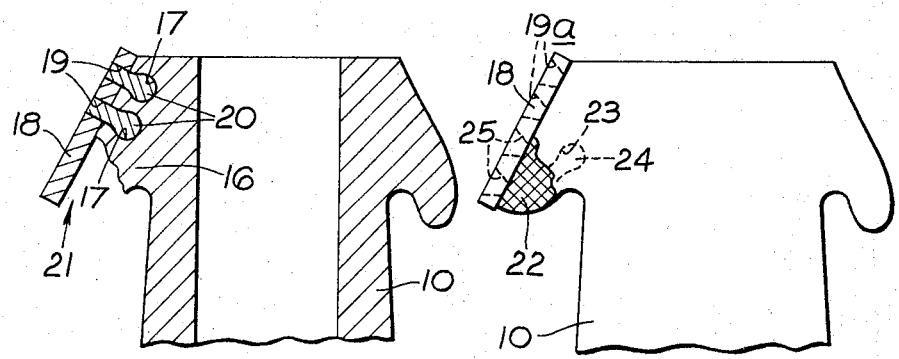
FIG. 6 is a section corresponding to FIG. 4 and taken on the line VI-VI of FIG. 5.
FIG. 7 is a view similar to FIG. 4 but showing the lug completely repaired, and also showing some possible modifications.

FIGS. 4, 5 and 6 illustrate a first stage in a preferred method of repairing the mould, in conformity with the present invention. Firstly, a number of bulb holes 17 are burnt into the remaining part of the broken lifting lug 16 from the upper outer flat surface thereof. Then a repair plate 18, of shape approximately corresponding to the original outer shape of the lug 16, and having holes 19 corresponding to the bulb holes 17, is positioned against the flat outer surface of the broken lug 16, so as to protrude downwards as shown; thereupon, weld metal is filled into the holes 17 and 19 to form anchors 20 which securely anchor the plate 18 in position. This weld metal may not fuse very securely with the haematite iron of the lobe 16. However, because the holes 17 are bulb-shaped, the weld metal forms therein enlarged heads which are firmly and securely retained. The weld metal fuses satisfactorily and reliably, of course, with the material of the repair plate 18.

The repair plate 18 having been secured in position, a gap or cavity 21 remains between or is defined between the lower projecting portion of the repair plate 18 and the confronting fractured surface of the broken lug 16. This cavity 21 is now filled with weld metal as has been indicated at 22 in FIG. 7, to complete the repair.

Such a repair has been found, in practical trials, to be completely satisfactory, and serves to prolong the life of the mould which would otherwise become prematurely useless.

The invention is not confined to the precise details of the illustrated example, and variations may be made thereto. For example, further bulb holes as indicated at 23 in FIG. 7 may be provided in the broken lug 16 to enable the added weld metal 22 to incorporate one or more anchors 24 which also become embedded in the material of the mould 10. The holes 19 in the repair plate 18 can, of course, be shaped to ensure a particularly secure connection of the weld metal thereto for example by being frusto-conical as indicated at 19a in FIG. 7, and apertures or recesses as indicated at 25 in FIG. 7 may be provided in the plate 18 to constitute additional anchorages for the weld metal 22. Naturally, the shape of the plate 18 can be varied, if necessary, according to the nature of the precise damage to the lug, in each particular instance.

I claim:

1. A method of repairing an ingot mould having, at opposite sides thereof, lifting lugs each of which has a downwardly and outwardly inclined outer surface and should comprise an outwardly-directed lobe, said mould having had one of its said lifting lugs damaged by its said lobe having been broken away to leave a fractured surface, said method comprising:
   a. forming bulb holes in the remaining part of said damaged lifting lug, from its said outer surface;
   b. applying, to said outer surface of said remaining part of said damaged lifting lug, a repair plate having therethrough securing holes, in a disposition with said securing holes registering with said bulb holes and with part of said repair plate projecting downwards to define a cavity between itself and said fractured surface;
   c. securing said repair plate in said disposition by filling weld metal into said bulb holes and said registering securing holes; and
   d. filling said cavity between said repair plate and said fractured surface with weld metal.

2. A method as set forth in claim 1 wherein said registering securing holes in said repair plate are of frusto-conical configuration with their wider ends remote from said outer surface of said remaining part of said damaged lifting lug.

3. A method as set forth in claim 1 which includes forming further bulb holes in said remaining part of said damaged lifting lug from said fractured surface thereof, said weld metal filled into said cavity being filled also into said further bulb holes to form anchors in said further bulb holes.

4. A method as set forth in claim 1 wherein said repair plate includes anchorage apertures facing said fractured surface, said weld metal filled into said cavity being filled also into said anchorage apertures to form anchorages in said apertures.

* * * * *